June 21, 1938.  G. T. BALFE  2,121,003
CUTTING MACHINE
Filed Sept. 23, 1933   9 Sheets-Sheet 6
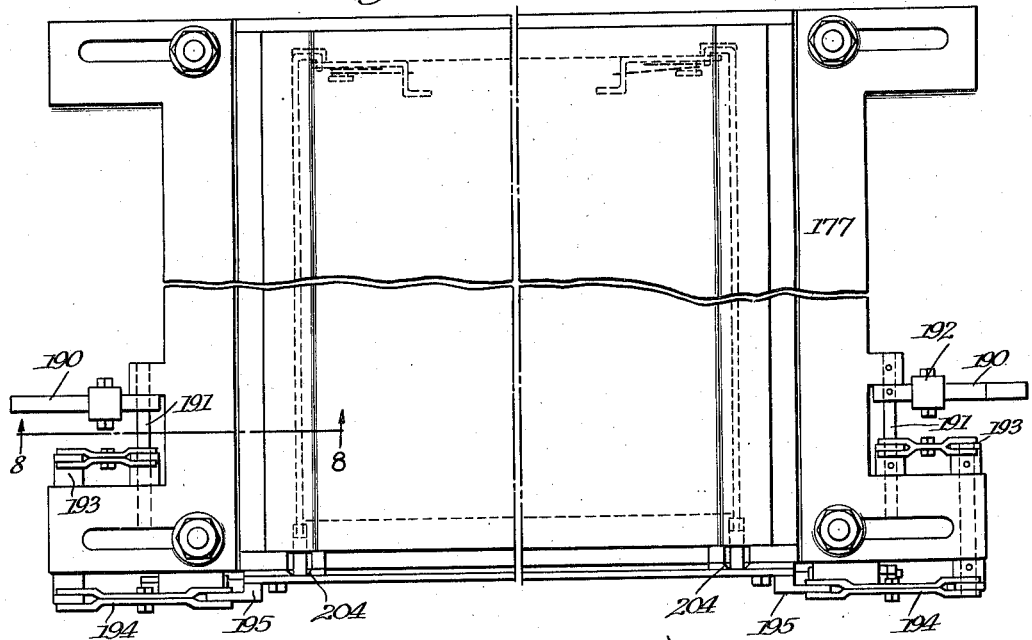
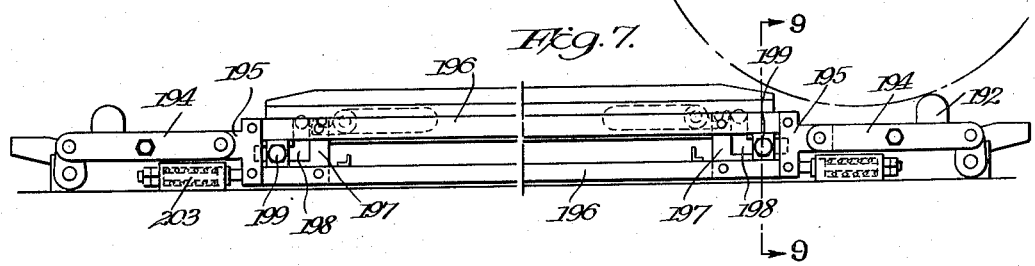
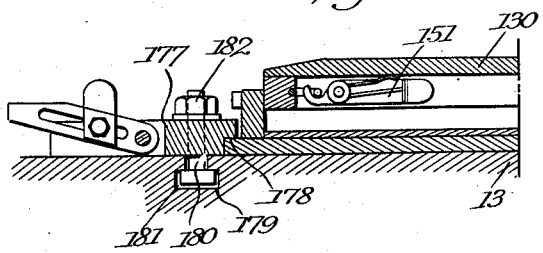
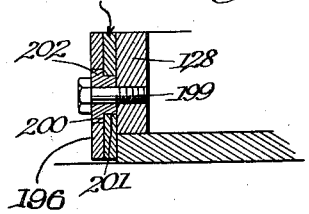
Inventor
George T. Balfe.
By Cushman, Darby & Cushman
Attorneys

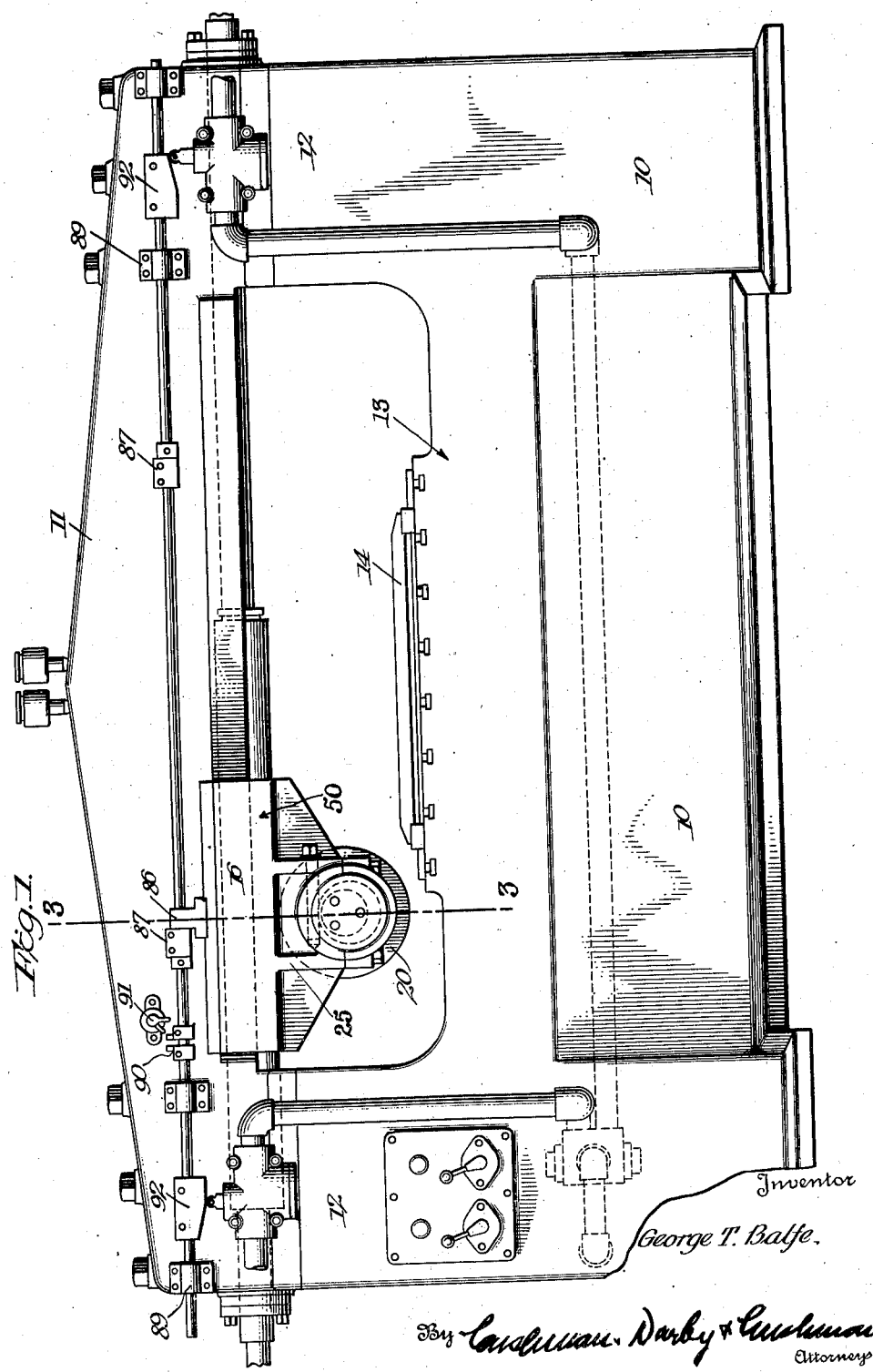

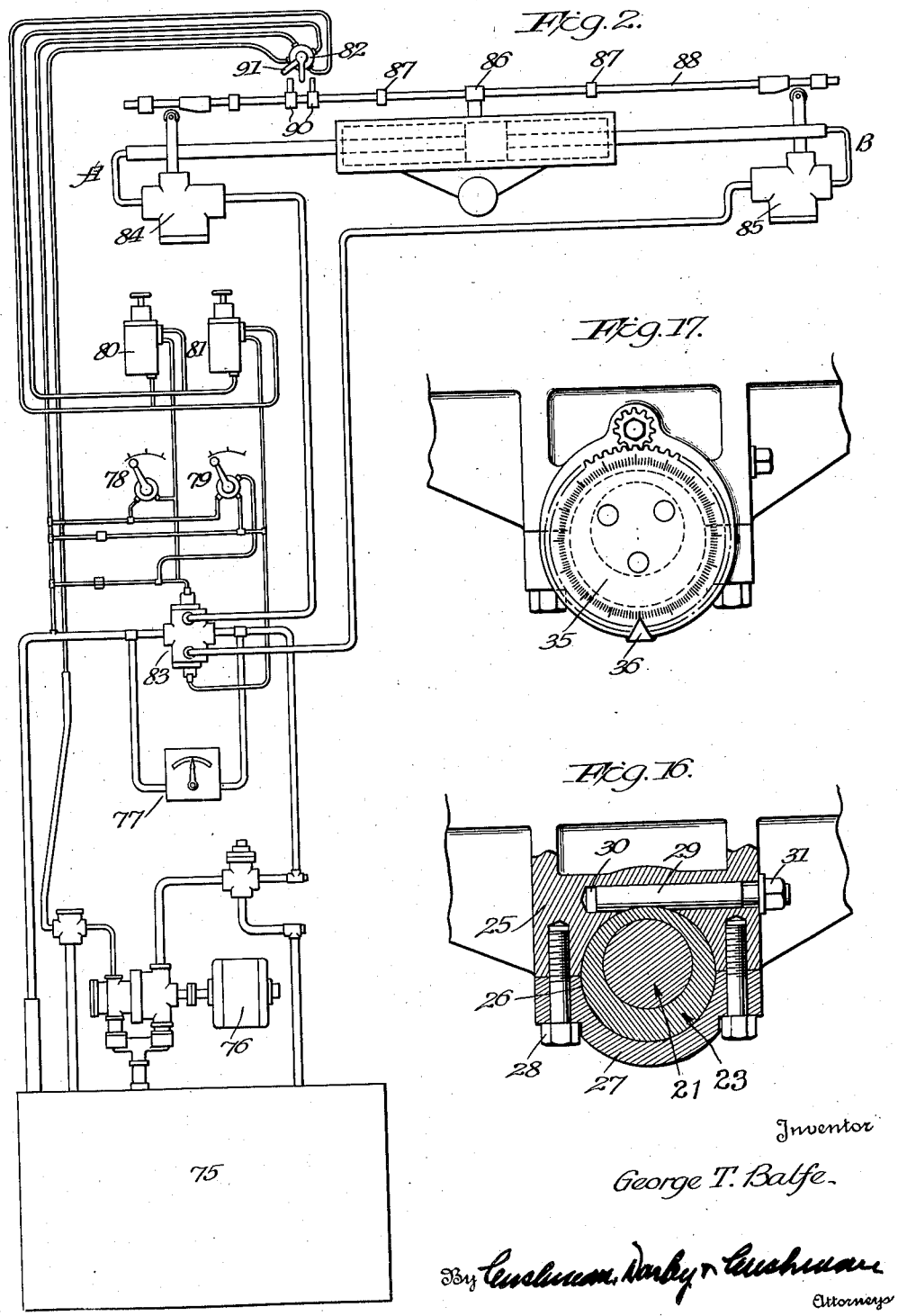

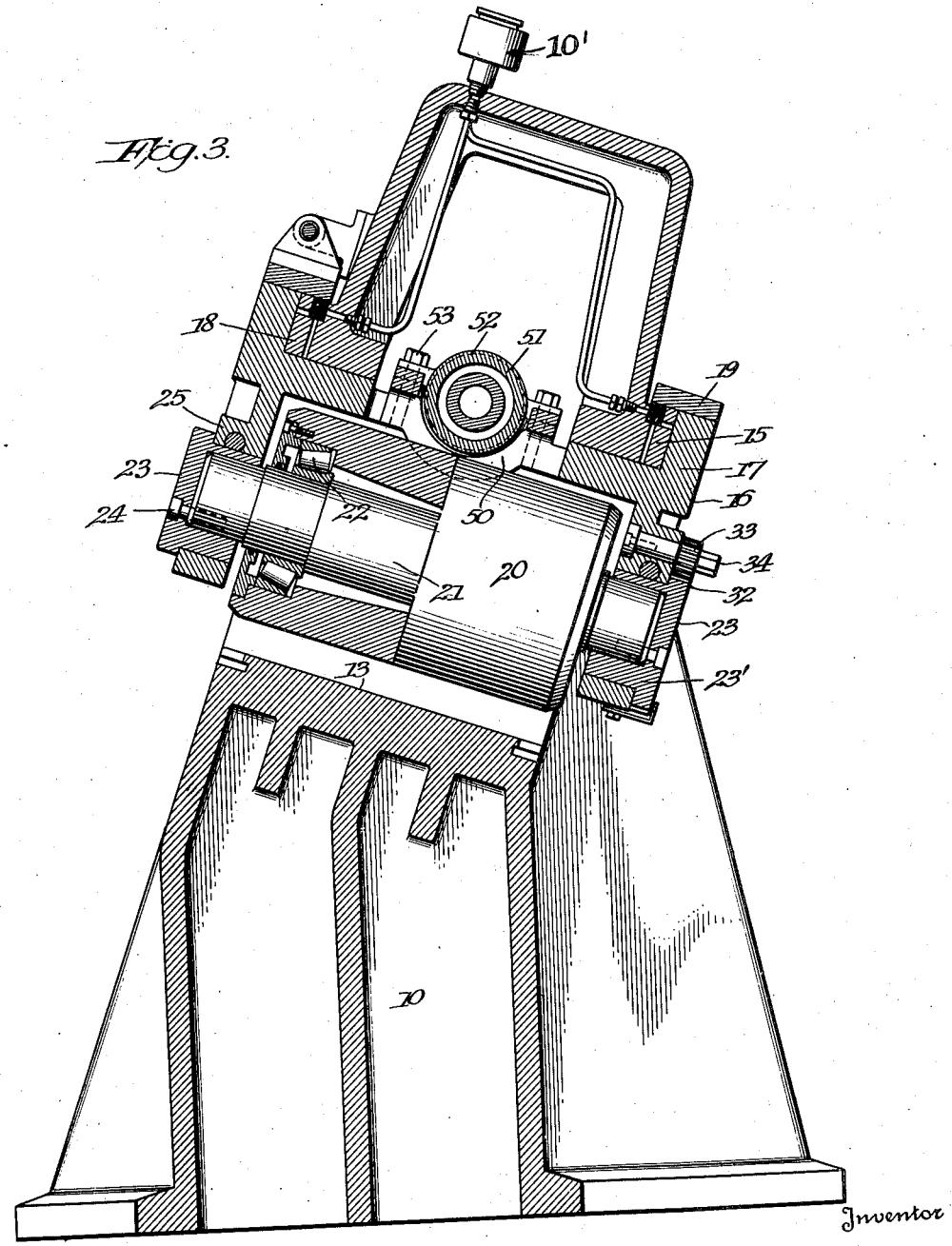

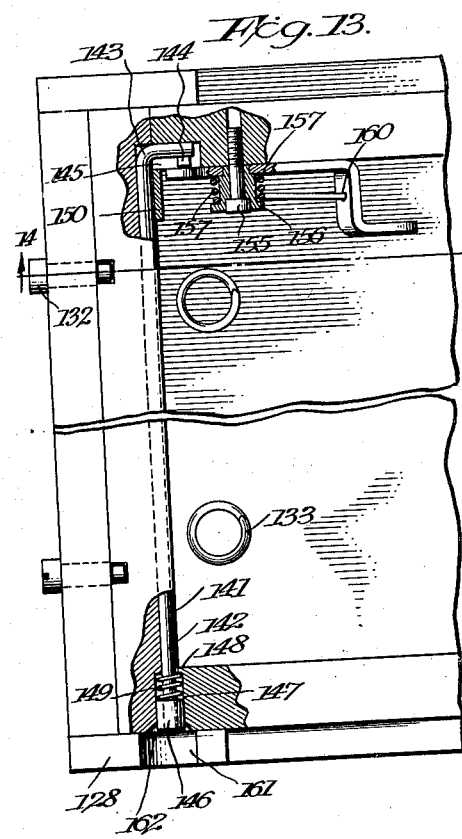
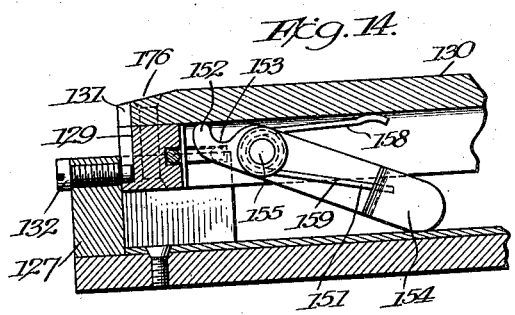
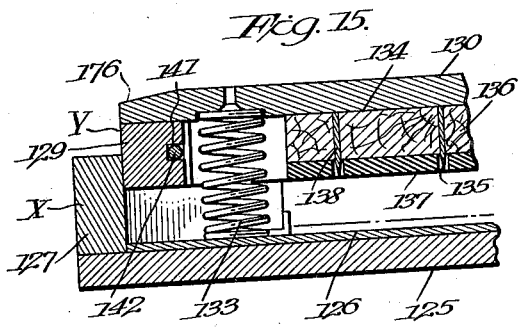
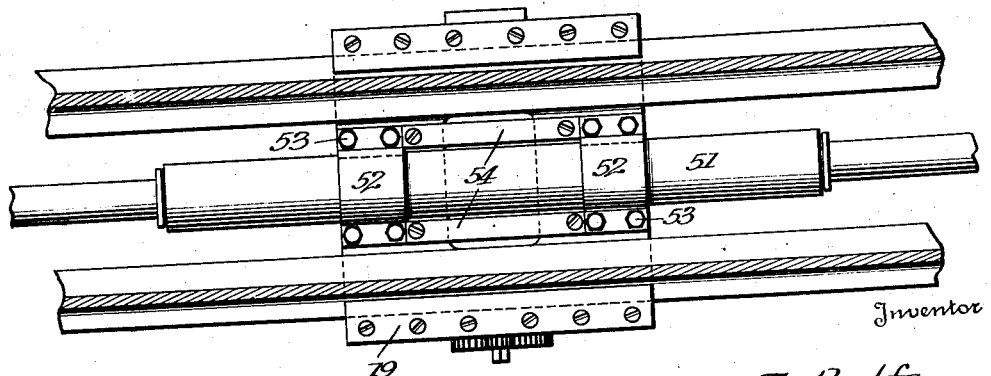

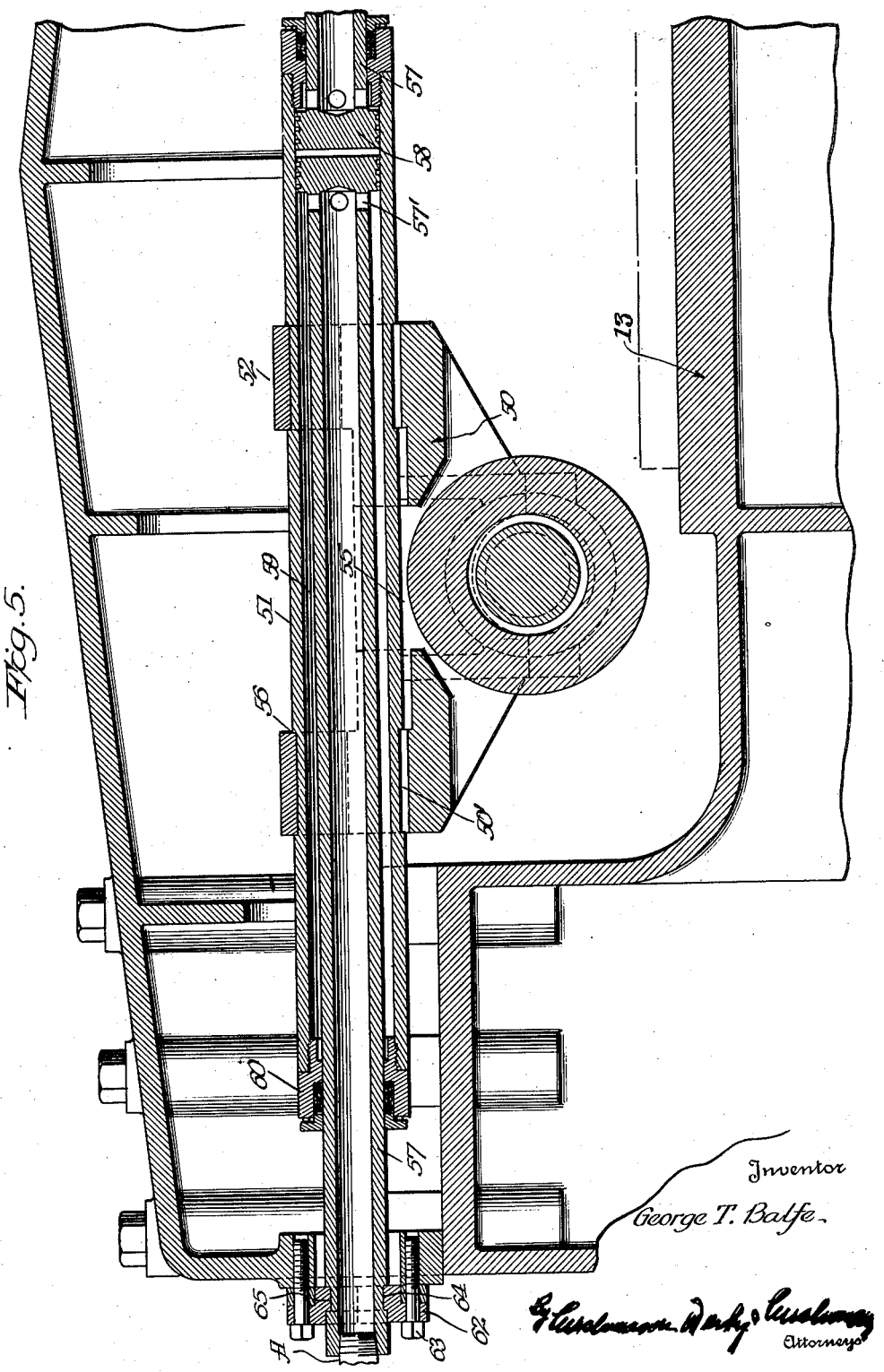

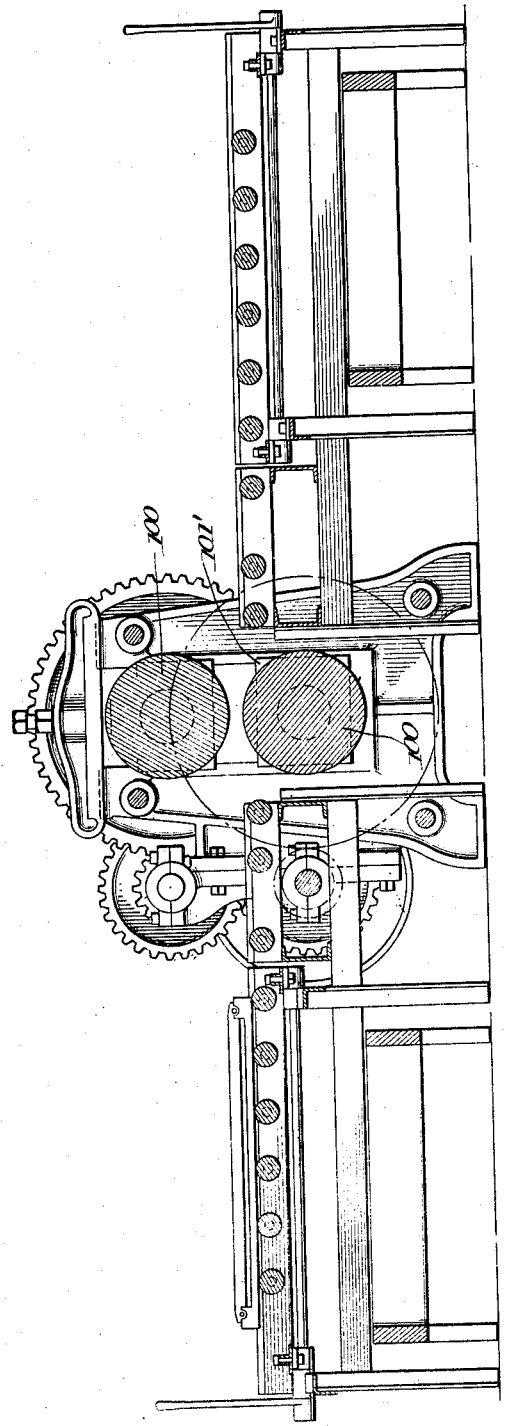

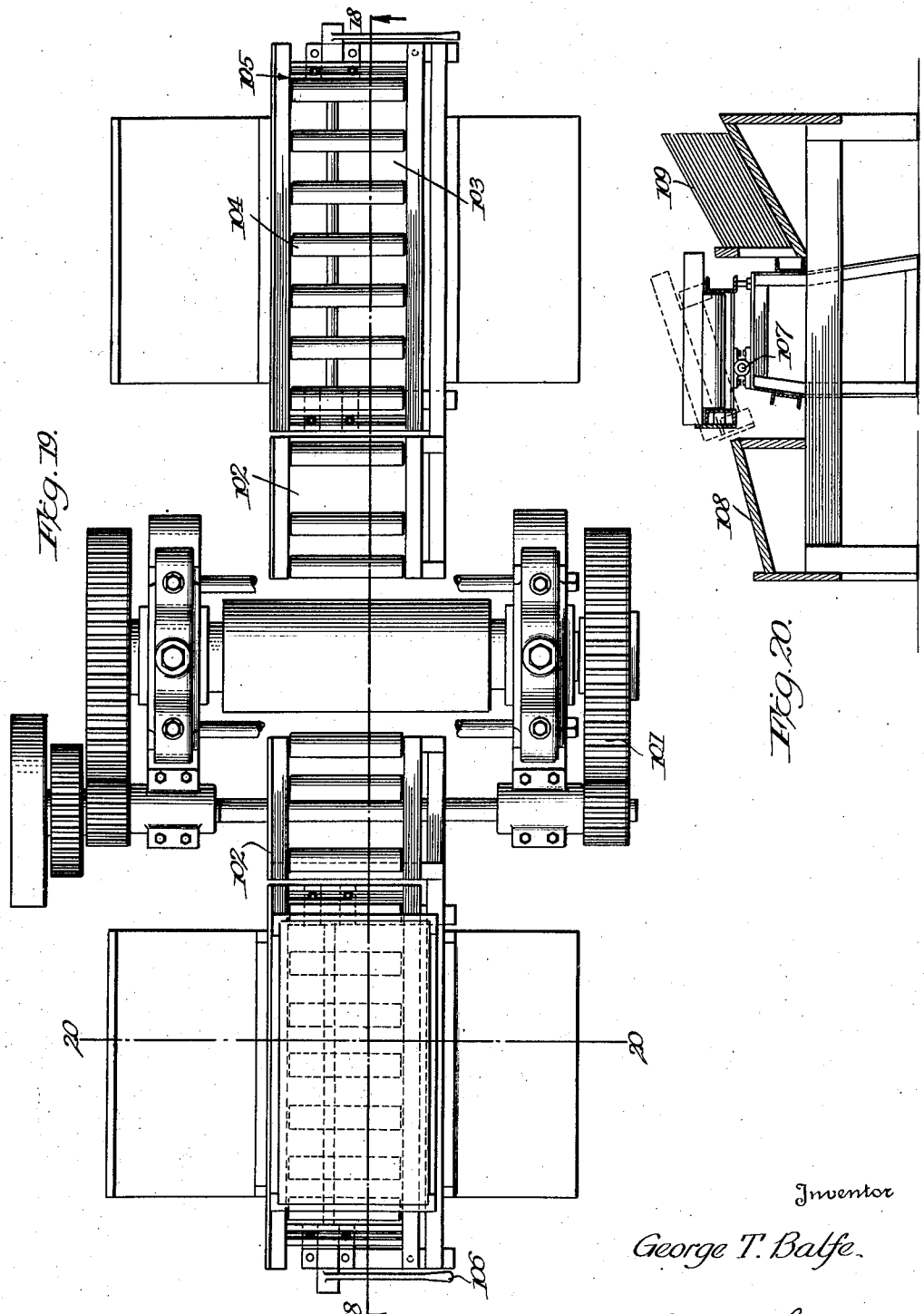

Patented June 21, 1938

2,121,003

UNITED STATES PATENT OFFICE 2,121,003

CUTTING MACHINE

George T. Balfe, Detroit, Mich., assignor to Detroit Gasket & Mfg. Co., Detroit, Mich., a corporation of Michigan Application September 23, 1933, Serial No. 690,740

31 Claims. (Cl. 164—19)

My invention relates to a method of and machine for cutting and punching laminated and non-laminated sheet-like structures. It is especially applicable in connection with punchable sheet materials that are difficult to penetrate such as, those of a hard, dense, thick or heavy character.

More particularly, the invention is useful in connection with laminated material including a sheet metal layer, and the punching of gaskets therefrom of the type disclosed in my United States Patent 1,776,140.

Heretofore, single acting punch presses have been employed and these present a number of objections. In the first place, with single action punch presses, and various types of platen presses now on the market, the cutting die must act simultaneously upon the entire area of the sheet. Hence, the pressure must be applied to all points of the die at the same time. This requires a tremendous, if not excessive, pressure with correspondingly increased power requirements. The expense of the power supply for maintaining of such high pressures, and the resultant wear upon the machine is so considerable as to constitute a serious economic factor in the production of gaskets and similar relatively low priced articles where production costs must be carefully watched.

Again, such a single acting press, operated under the high pressures required, results in wear and breakage of the cutting knives by impact upon the bed plate. Not only are the cutting instrumentalities therefore short-lived, requiring frequent stoppage of the machine and replacement, but the wear upon the dies results in imperfect shearing and punching. Hence, articles are often produced which are inferior and defective before the trouble is observed by an inspector and such articles must be rejected. This is particularly the case with articles having varying and difficult contours such as gaskets and in which accuracy within fine limits is required.

Also, with the customary single acting press in which the pressure is applied to all parts of the blank equally and simultaneously, it has not been feasible to attempt to work on sheets beyond a definite size limit. This is, of course, due to the tremendous pressure and power required. Moreover, with the single acting machine, usually but one punching operation can be performed satisfactorily, and the article must then be subjected to a subsequent punching operation in another machine to complete it. In other words, the punching with a single acting type of machine is limited to a single operation, for example, in cutting a cylinder head gasket, the cylinder centers and the outside trim must be acted upon in another press to cut small exhaust and ring gaskets. Likewise, the waste, some of which is of a size to be useful for forming other products, must be separately subjected to a punching operation.

The punching machines now in use are, therefore, limited in the operations which can be performed and the articles cannot be cut and formed in an economic time cycle. The high pressures necessary require excessive consumption of power, and tend to produce wear, particularly on the punching dies, making them short-lived, cutting down production and impairing the quality of the final product.

The present invention accomplishes the punching and forming operation by applying pressure gradually and continuously over consecutive portions of the die and the sheet material.

That is, the die is operated by a rolling pressure, as distinguished from a force acting simultaneously upon the entire area of the die. This rolling pressure is exerted progressively upon tangential contact portions of the die, and hence individual areas of the sheet material are subjected to a continuous punching and forming operation by the rolling engagement. Thus the pressure applied at any point is along a tangential line and (1) need be only a fraction of that used in a single acting press, resulting in (2) consequent greatly reduced consumption of power.

The method, therefore, comprises punching and dieing out a sheet material, by gradually applying the cutting instrumentality to the sheet by means of a rolling pressure in a continuous manner to consecutively shear individual portions of the sheet along tangential lines, and controlling the pressure and speed of the rolling contact. The method also comprises disposing the sheet material in a chuck having a bed plate upon which is disposed a coextensive flexible and resilient plate or liner, on which the sheet rests, and relatively movable cutting dies or knives disposed above the bed plate and facing the same and suspended from a resiliently mounted die carrying member or plate of substantially similar material, whereby the rolling pressure will be fully and directly exerted to assure accurate and complete shearing of the sheet without injury to the cutting knives or dies.

The chuck is preferably fixed and engaged by a reciprocating roller, forming a complete and finished article upon each movement of its reciprocation, but may also be fed between a pair of superposed rotating rollers.

The pressure exerted by the rolling contact of the roll on the chuck is equal to or may even be greater than that exerted per unit area by the single acting press. I find that in progressively subjecting the individual areas of the sheet material to a rolling pressure in the manner described, that the operation is not limited by the character of the sheet material. For example, gasket material comprising a layer of metal interposed between layers of compressed asbestos is efficiently punched out.

Furthermore, in the case of a cylinder head gasket formed of this heretofore difficultly punchable material and requiring several operations, I find that all of the openings and the trimming of the gasket are accomplished by a single engagement of the roller and chuck. In other words, the complete final article is formed in one actuation of the machine and no separate treatments are required.

Of equal importance, the useful waste, for example from the cylinder openings of such a head gasket, is simultaneously cut and formed into gaskets of smaller dimension during this same and single actuation of the machine, and need not be subjected to an additional operation.

Also, because of the rolling pressure, and the method and machine of this invention, the area of the blank which may be worked upon is unlimited. For example, I am able to form two or more complete cylinder head gaskets at each actuation of the machine and I refer to gaskets of this type, because of the numerous operations attendant upon their production and the difficulty of punching the laminated sheet material having a metal core, as described in the Balfe patent. At the same time, I am able to form from the waste, the optimum number of smaller dimension gaskets.

In the preferred machine of this invention, the roller is reciprocated by hydraulic means and its speed of contact with the chuck and the cutting of the blanks are susceptible of nice control. The machine is free of vibration and consequent excessive wearing of the parts, and means are provided to prevent any sharp impacts of the cutting knives upon the bed plate of the chuck, such as would distort or cause breakage of the cutting knives. That is, the smooth actuation furnished by the hydraulic means, the construction of the chuck whereby the throw of the knives is limited, and the flexible top and bed plates of the chuck enable a clean severing without sharply or abruptly forcing the knives into contact with the material to be sheared, or the bed plate. The latter being flexible, furnishes a resilient stop for the knives, enabling them to sever the material cleanly without danger of injury to the extremities of said knives or dies.

The speed of production of punched articles by employment of the method and machine of this invention is considerably increased over present practice. This is due (1) to the substantially automatic operation of the machine, (2) to the fact that the size of the material treated is not restricted so that any number of articles may be produced by a single actuation of the machine, and (3) the complete articles are formed by a single actuation of the machine, i. e. upon each movement of the reciprocation of the rolling instrumentality. Stated again, the present invention permits the production of an increased number of complete articles by a single actuation and enables the cutting and forming to be accomplished within an economic time cycle.

With the present invention, moreover, varying and difficult contours are produced, and since individual portions of the sheet material are consecutively treated by the gradual continuous exertion of the rolling pressure, the accuracy of the severing is precise.

In the use of a rolling pressure as included in this invention, the roller at no time comes in contact with the die and since the throw of the die is controlled and the operation of the machine is free from abrupt sharp impacts of the die upon the work or the bed plate and is substantially devoid of vibration, the cutting knives particularly and the machine are long-lived. This is important since stoppage due to wear or breakage is reduced to an absolute minimum and the production of imperfect articles which must be rejected, becomes a negligible factor.

While I have referred above to gasket material of the laminated type having a metal insert, it will be understood that the present invention is applicable to cut and form articles from blank materials which are normally easy to punch, as well as more difficultly punchable sheet materials. The present invention is advantageous, as will be apparent, in that it enables a considerable saving to be effected as regards the power employed, the wear upon the machine, and increased production of complete finished articles by a single actuation in an economic time cycle.

Referring to the drawings:

Figure 1 is a side elevation of my improved machine.

Figure 2 is a working plan view thereof and showing the hydraulic means for automatically operating the machine.

Figure 3 is a sectional view on the line 3—3 of Figure 1.

Figure 4 is a top plan view of the hydraulic cylinder or ram and the carriage means connected thereto, by which the pressure roller is reciprocated.

Figure 5 is a sectional view showing in detail the hydraulic cylinder or ram and the manner in which the roller carriage is connected to the movable cylinder.

Figure 6 is a top view of one of the chucks employed.

Figure 7 is a side elevation of the chuck of Figure 6.

Figure 8 is a sectional view of the chuck taken on the line 8—8 of Figure 6.

Figure 9 is a sectional view on the line 9—9 of Figure 7.

Figure 13 is a top view of the interior of the chuck showing means for guiding the sheet material positioned therein, such means forming a stop at one side of the chuck.

Figure 14 is a detailed sectional view taken on the line 14—14 of Figure 13.

Figure 15 is a sectional view of the chuck shown in Figure 6 or Figure 10, and illustrating in detail, the cutting instrumentality and the springs for maintaining the cutter spaced from the bed plate of the chuck and on which the gasket material rests.

Figure 16 is a detail view showing the manner in which the roller instrumentality illustrated in Figure 3 is adjustably mounted upon the roller carriage with respect to the chuck.

Figure 17 is a detail view showing means for accurately adjusting the roller within very fine limits.

Figure 18 is a side elevation partly in section of a modified form of machine.

Figure 19 is a top elevation of the machine shown in Figure 18, and

Figure 20 is a sectional view taken substantially along the line 20—20 of Figure 19.

General construction

Figure 10:
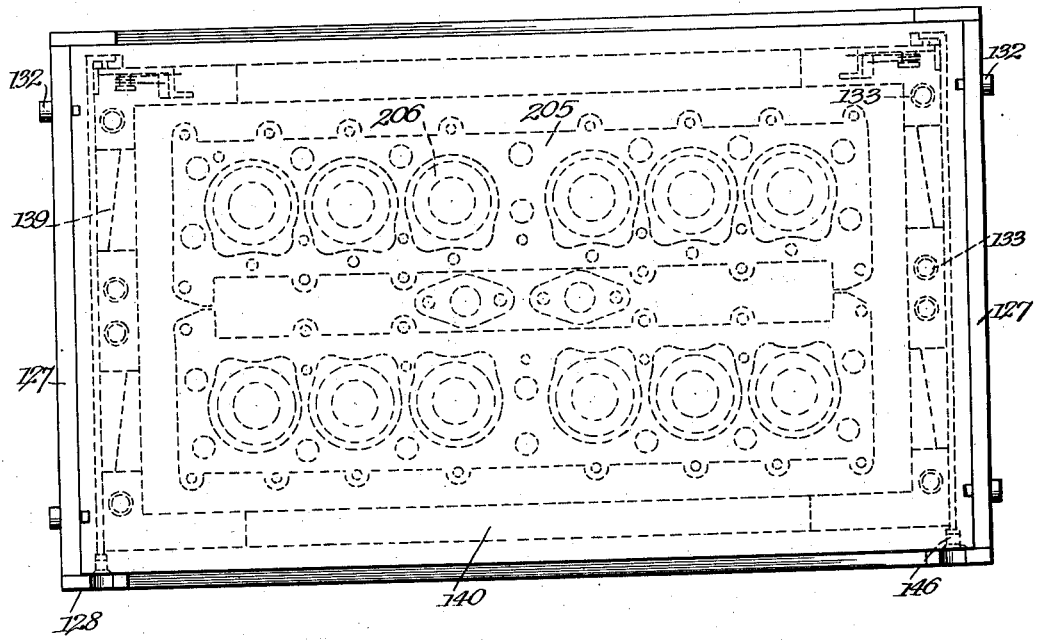
Figure 10 is a top view of a chuck showing in dotted lines a sheet of material of a size to permit formation of two complete cylinder head gaskets therefrom, as well as smaller gaskets from the waste.

The punching machine illustrated in Figure 1 is the preferred form and comprises a base, a chuck fixed on the base, having the cutting instrumentality associated therewith adapted to receive the blank sheet material to be punched. A roller carriage automatically reciprocated by hydraulic means and carrying a roller is adapted to contact with and pass over the chuck to depress the cutting knives through the sheet and accomplish the punching operation.

The machine illustrated in Figure 18 comprises a base, and a pair of superposed rolls through which the chuck is passed and the cutting instrumentality similarly operated to accomplish punching.

In each case, the blank sheet which is supported within the chuck, is gradually but continuously cut, i. e. consecutive portions of the material are acted upon by the cutting knives, as the roller (a) passes over the chuck as in Figure 1, or (b) the chuck passes between the rollers as shown in Figure 18.

The preferred embodiment of the invention

Referring to Figure 1, the machine comprises a base indicated at 10, and a substantially hollow cross head or frame indicated at 11. The frame 11 is supported by the spaced legs 12 of the base, being bolted thereto as shown in Figure 5 or united in any convenient and rigid manner. The base substantially intermediate the legs 12 is provided with a table portion 13, inclined with respect to the horizontal, and to which is detachably secured or fixed as by bolts or in any desired manner, the chuck or bed block 14 within which is disposed the material to be punched and with which chuck is associated a movable cutting instrumentality. The details of the chuck will be later herein described.

The cross frame or cross head 11 is provided with flanges 15, as shown in Figure 3, which extend on opposite sides of the cross head substantially across the same within the distance defined by the space between the legs 12. Supported by the flanges 15 to depend therefrom and slide on said flanges, is a roller carriage indicated as a whole at 16 and which is illustrated in detail in Figure 3.

The carriage is provided with angular portions 17 slidably fitting the adjacent correspondingly angular base portions 18 of the cross head 11 and is also provided with flanges 19 extending over the flanges 15 of the cross head, by which the carriage is slidably supported in depending relation upon the cross head. The flanges 19 are preferably bolted to the upstanding angular portions 17 of the carriage, as shown in Figure 4. The engagement of the flanges 19 of the roller carriage and the flanges 15 of the cross head constitutes the principal and, in fact, the only, actual means for supporting the carriage for sliding movement with relation to the chuck. The provision of these flanges and the engagement between the angular portions 17 of the carriage and 18 of the cross head serves to effectively guide the roller carriage in its reciprocatory movement. A suitable continuous lubricating means, as shown at 10 10', is employed to lubricate the joint between the contact surfaces of the respective flanges and angular portions. The importance of so supporting and guiding the roller carriage will be again referred to. However, it will be noted here that the roller carriage is supported with its axis extending in a plane inclined to the horizontal and that there is only a single suspension of the carriage, so that it may slide with a minimum of friction and the contact surfaces of the carriage and cross head are continuously lubricated.

The roller 20 is of appropriate weight and has a shaft 21 upon which the roller is supported for free rotation by means of the roller bearings 22. The shaft 21 is fixed at its ends in eccentrically mounted normally fixed, but rotatable, bushings 23. The shaft is connected to the bushings to rotate therewith by means of pins 24. The bushings are mounted in the depending trunnion portions 25 of the carriage which comprise a split bearing indicated at 26, as shown in Figure 16 having the portion 27 thereof bolted to the carriage by bolts 28. The eccentric mounting of the bushings in the split bearing 26 is best illustrated in Figure 16 and the bushings are held against rotation by the locking pins 29 movable in recesses 30 in the carriage 16, said locking pins having arcuate or inclined portions, whence they may be wedged against the bushing by means of the nuts 31 to fix them against rotation, or loosened thereby to permit turning of the bushings.

The bushing 23' at one end of the shaft is provided with gear teeth 32 meshing with a spur gear 33 having a turning portion or shaft 34 adapted to be engaged by a suitable wrench. The face of the bushing 23' is provided with a scale 35 as shown in Figure 17 and a suitable pointer 36 is connected to the bearing portion 27 to cooperate therewith. In this manner, turning of the shaft 34, after the pins 29 have been released, will permit the eccentric bushings 23 to be rotated and the extent of rotation definitely determined to adjustably position the roller with relation to the chuck. That is, the roller will be raised or lowered with respect to the adjacent surface of the chuck over which it travels and thereby the distance of the throw or depression of the cutting knives is regulated. The turning movement of the bushings is precisely controlled by the scale and pointer and hence the cutting action is accurately adjusted for the particular sheet material and cutting instrumentality utilized. Such accuracy is vital to assure a clean shearing and prevent overthrow and distortion or breakage of the knives.

The operation of the carriage

The carriage, as stated, is reciprocated on the cross head or frame 11 and the power for producing this movement is preferably obtained by means of a hydraulic system illustrated in Figure 2. The hydraulic system per se is not a part of the present invention, but is illustrated for purposes of clarification.

Referring to Figures 3, 4 and 5, the carriage 16 is provided with intermediate transverse webs 50 disposed about the reciprocating cylinder 51 of the hydraulic system, but spaced therefrom and connected to said webs and extending thereover are the strap or cap members 52 bolted to the webs at 53. Also bolted to the webs between the straps 52 are thrust bars 54. It will be noted that the webs are spaced a sufficient distance to clear the roller and permit free rotation thereof as shown at 55 in Figure 5. Also, the straps 52, which are bolted to the webs 50, fit in grooves 56 in the cylinder 51, whereby the carriage is fixedly connected to the cylinder 51 and will move therewith as the cylinder is reciprocated. It should be noted here that the webs 50 do not contact with the cylinder being spaced therefrom as at 50' and only the portions of the arcuate straps 52 fitting in the grooves 56 engage the cylinder 51, so that movement of the cylinder will reciprocate the carriage. That is, the carriage is supported by the flanges 15 and 19 of the cross head and carriage respectively and guided by their angular portions 17 and 18. The connection between the carriage and the cylinder is, therefore, such that no strain, such as might result from starting and stopping of the machine, is translated to the cylinder.

As stated, the carriage is reciprocated by the hydraulic power system illustrated in Figure 2, and this consists of a ram which comprises a pair of fluid lines 57 as shown in Figure 5 arranged upon opposite sides of a fixed piston 58, closing the ram at one end. The fluid lines and cylinder are housed within the cross head 11, as shown. It will be observed that the lines or pipes 57 are of smaller diameter than the cylinder 51 and that a fluid space is created therebetween indicated at 59. Closing this space 59 at the other end of the ram and forming a bearing through which the cylinder may slide over the respective pipes 57, is a cap bearing 60, threaded to the end of the cylinder.

The cylinder 51 which moves the carriage 16 is supported by the line or pipe 57 at opposite sides of the cross head 11, as shown in Figure 5, the line at its outer end on each side of the cross head being fixedly supported upon the cross head by a block 62 bolted to the cross head by bolts 63. The block 62 is provided with a flange 64 fitting in a cooperating groove 65 in each end of the line. It will, therefore, be observed that the fluid lines 57 are rigidly secured in position and supported by the cross head and that the cylinder 51 is mounted for reciprocating movement upon the lines or pipes 57 and carries in its reciprocating movement the roller carriage 16, whereby the latter is passed to and fro across the chuck. As stated above, this reciprocatory movement does not occasion any perceptible strain upon the cylinder.

Referring to Figure 2, the hydraulic system comprises, of course, a fluid tank 75 and a motor 76. The speed control valve is indicated at 77 and controls the speed of the carriage across the chuck. Two control valves 78 and 79 are employed, one as a stop run lever for use in emergencies or set-up stops. The other lever is employed to cause the cylinder to stop at the end of its stroke or to reciprocate continuously. In the normal operation of the present machine, the lever 79 will be placed in neutral, so that the machine will continuously reciprocate. The numerals 80 and 81 represent delay valves which act to retard the return movement of the cylinder at the end of its stroke. An automatic reversing valve 82 operates in conjunction with the valve 79 when the latter is set for continuous reciprocation of the cylinder and also cooperates with the supplemental reversing valve 83. A pair of deceleration valves 84 and 85 are employed, whereby the speed of reciprocation of the cylinder and hence the carriage is controlled as by being slowed down after it passes off the chuck and before the limit of the stroke of the cylinder is reached.

Referring to Figures 1 and 2, the carriage carries an upstanding lug 86 disposed substantially intermediate its ends or at any desired point and which lug engages stops 87 carried upon a sliding bar or rod 88 mounted to have reciprocating movement in the brackets 89 secured to the cross head 11. Also arranged on the bar 88 is a pair of trip members 90, which engage the respective levers 91 of the reversing valve 82. The rod 88 also carries at each of its ends a cam member 92 to operate the respective decelerating valves 84 and 85. In connection with the use of decelerating valves, they not only control the speed of the carriage after it leaves the chuck, but likewise act to cushion any impact resulting when the cylinder reaches the ends of its stroke.

It will be understood that while I prefer a hydraulic system, that any other fluid pressure or mechanical means may be employed which will permit a reciprocatory movement to be imparted to the carriage, and wherein the speed of travel of the carriage, its automatic reversal and the control of its speed over the chuck and between the period when it leaves the chuck and is reversed are provided for. Preferably as much as possible of the hydraulic system is housed within the base 10 and thus protected.

These factors are important in an automatic punching machine of the type wherein the movement of the roller over the chuck is gradual and continuous, so that pressure is progressively applied to the chuck to depress the cutting instrumentalities and produce a severing upon consecutive individual portions of the sheet.

Referring to Figure 5, fluid is supplied to and discharged from the line 57 through the combined supply and discharge lines A and B. Fluid entering the line 57 through either supply line A or B, passes through the openings 57' adjacent the piston and enters the space 59. The pressure built up within this space will serve to impart the desired sliding movement to the cylinder and hence to the carriage. The operation of the reversing mechanism with its several control and reversing valves will permit an automatic reciprocation at the desired speed and there is no abrupt or other objectionable vibration action such as would wear the parts or produce misalignment. The decelerating valves 84 and 85 are important, in that they take up or absorb the shock incident to the arrest of the movement of the cylinder and its return at the end of the stroke. Moreover, these decelerating valves slow down the movement of the cylinder and the carriage after the roller has passed off the chuck, whereby a sufficient time will elapse for the material which has been cut and formed to be ejected from the chuck. Also, the delay valves 80 and 81 will retard the reversal of movement of the cylinder, as well as the time period before it again contacts with the chuck, so that a new sheet of material may be inserted in the chuck ready for the punching operation.

It will be observed that by the provision of the hydraulic means a substantially automatic time controlled reciprocation of the roller carriage is provided for, which is independent of the chuck. Also, by reason of the automatic actuation of the roller carriage, the speed of production can be regulated as desired. This is important, since articles of the type which are punched from blanks, are made in large numbers and it is necessary that the machine operate within an economic time cycle.

It is also to be observed that since the roller carriage is movably positioned for sliding movement on the cross head 11, and the roller adjustably mounted on the carriage by reason of the eccentric bearings 23, that a uniform pressure will be applied to all parts of the chuck. The hydraulic apparatus insures that the speed of travel of the carriage will be uniform over the chuck, and hence the cutting dies will be gradually and continuously depressed to punch out consecutive individual tangential areas of the blank material.

The roller being freely rotatable, and of a weight to exert the desired pressure, will accomplish the desired depressing of the cutting knives and insure a clean severing of the blank and the forming of a complete article. Since, as stated, the position of the roller with respect to the chuck is adjustably regulated in a precise manner by the eccentric bearings 23, all danger of injury to the extremities of the cutting knives with resultant distortion and breakage is eliminated, the knives being depressed a sufficient distance by the rolling contact to extend through the blank sheet the exactly required distance to procure the complete shearing action.

Modified construction

In the modified construction shown in Figures 18, 19 and 20, a pair of superposed rolls 100, having their shafts mounted in adjustable bearing blocks 100', are rotated by means of a suitable reversible prime mover through the intermediate gearing indicated as a whole at 101 and upon each side of the roller system, there is arranged a fixed conveyor shelf 102 and a tiltable conveyor shelf 103, the respective shelves being in alignment. The conveyor shelves are preferably of the type having a plurality of rollers 104 and suitable angular guide bars 105. A chuck 14 will be positioned upon the conveyors, the operator standing at one side of the machine and feeding the chuck through the rolls, whence the punching operation will take place gradually and continuously upon consecutive tangential portions of the sheet, and the chuck will be discharged with the finished cut sheet upon the conveyor on the opposite side of the roller system. The operator at that side of the machine will reverse the direction of rotation of the rolls, feed another chuck as described, and will then swing the lever 106 to rock the tiltable conveyor 103 upon its pivot 107 to tilt the chuck which has just been operated on, whereby the chuck will be inclined, as shown in dotted lines in Figure 20, and the punched sheet will discharge from the chuck by gravity and be collected on the inclined table 108. At the same time, the operator will take one of the sheets 109 and place it in the now empty chuck, reverse the lever 106 and feed the chuck in proper sequence and in a similar manner back to the operator on the opposite side of the roller system.

It is to be observed that in the operation of the machine described in Figures 18, 19 and 20, that the chuck is subjected to a rolling contact between the rollers and that the cutting instrumentalities are, therefore, gradually acted upon to cut the blank sheet in a continuous manner, i. e. consecutive individual portions of the sheet along lines tangential to the rollers are progressively treated.

The chucks

The term "chuck" is used to generically describe a construction embodying a work support and a member carrying dies or knives facing said support, and as will now be described in detail.

In Figures 6 to 15 inclusive, I have illustrated the chucks employed in connection with the machines illustrated in Figures 1 and 18. These chucks are formed of metal, and the fixed parts thereof may be welded together or united by rivets or bolts. The chucks comprise two parts, a lower part or base X including a bed plate 125 and an upper part or resiliently mounted die carrying member Y, the upper part of the chuck being of a dimension to slide vertically within the lower part of the chuck, as shown in Figures 8, 14 and 15.

The lower part of the chuck i. e. the bottom or bed plate indicated at 125 has superposed upon the same and secured thereto in any desired manner, a substantially coextensive liner or plate of flexible and resilient sheet metal 126. Connected to the bottom are opposed end walls 127, as best shown in Figures 8, 10, 14 and 15, and connected to the end walls, and to the bottom at each corner thereof, is a block 128 extending along the sides of the bottom, as shown in Figure 10. It will be observed that the ends of the lower part X of the chuck are closed, while each side is open between the blocks 128.

The upper part of the chuck is adapted to slide vertically within the lower part as stated, being guided in its vertical sliding movement by the end walls 127 and the blocks 128 forming corner guides. This upper part Y comprises a rectangular metal frame 129, to which is united by screws or rivets, a top plate or die carrying member 130. This top plate or floating member is formed of flexible and resilient metal and constitutes the contact portion of the chuck over which the rolling pressure is preferably exerted. The frame members 129 at the ends of the chuck are provided with recesses 131 within which are adapted to engage the inwardly projecting extremities of threaded pins 132 mounted in the end walls 127 of the bottom part of the chuck. The exposed ends of the said pins are adapted to engage the closed ends of the respective recesses 131, there being four recesses and four pins illustrated with the chuck shown in Figure 10. Disposed adjacent the frame members 129 at the ends of the chuck are a plurality of spaced coil springs 133 secured in position in any desired manner to either or both the top plate 130 and the bottom plate 126. These springs normally act to maintain or urge the upper part of the chuck resiliently projected or floating above the lower part, as shown in Figure 15, with the ends of the recesses 131 contacting with the extremities of the pins 132 and limiting the upward movement of the upper part.

Carried by the top plate or die carrying member 130, and spaced from the frame members 129 thereof, is the die indicated as a whole at 134. This die will comprise a plurality of cutting knives or rules 135, of a size and material and arrangement to obtain the desired cut-out configuration. Surrounding the cutting rules and also connected to the top plate 130, is a layer of cushion material 136 and the lower side of said cushion material is provided with a layer of rubber 137. The respective layers 136 and 137 are provided with openings 138 through which the cutting knives freely extend and the thickness of the laminated structure is substantially equal to the length of the cutting knives, as shown in Figure 15. In this connection also, the thickness of the end frame members 129 is substantially equal to the thickness of the laminated structure and the length of the cutting knives, so that when the upper portion of the chuck is depressed, the throw of the knives will be limited by the engagement of the bottom of the frame members 129 with the liner or plate 126.

It should be noted that since the top plate 130 is flexible and resilient, it will give slightly under the rolling pressure upon depression of the upper part Y, thereby causing the knives to descend beyond the distance defined by the vertical thickness of the frame 129. This will permit the knives to penetrate entirely through the sheet material and cleanly sever the same. In other words, by reason of the flexible top plate, the flexibility of which is sufficient to permit it to bend slightly under the rolling pressure, the extremities of the knives will project a very small distance on the opposite side of the sheet material. The top plate, as stated, is resilient, so that it is not distorted by the rolling pressure and quickly returns to its normal condition, being preferably formed of spring steel of the desired character, selected in accordance with the pressure exerted by the machine.

The provision of the flexible top plate 130 permits use of the machine in practicing my novel method. The flexible element holds in predetermined relative positions the individual dies which serve to form the separate openings in the gasket blank. At the same time, the flexibility of the holding element 130 permits these individual dies to be successively and independently forced into the blank to penetrate and shear the same along substantially rectilinear lines perpendicular to the plane of the material. In order to prepare an individual blank for cutting the desired number of separated openings therein, it is simply necessary to position the blank beneath the flexible element 130 which has previously had applied thereto in predetermined relation the desired number of cutting dies. These dies are thereafter held by the flexible element against movement in a horizontal plane relative to one another but they may be forced into the material progressively and substantially independently by progressively applying rolling pressure over the top of the flexible element, whereby successive transverse portions of the flexible element are flexed downwardly and the dies thereby successively forced into the gasket blank and shear the same.

The fact that the ends of the knives project through the sheet material to the opposite side thereof is effectively cared for by the provision of the flexible and resilient liner or plate 126. The metal of the liner or plate 126 is preferably of a softer nature than that of the cutting knives. The resilience and flexibility of this sheet and the relatively slight impact caused by contact of the knives therewith, is negligible in that no wear or breakage will take place with respect to the knives, nor will the liner or plate 126 be damaged. It is of a flexibility and resilience to absorb the relatively small degree of impact.

The die 134 is held in proper spaced relation with respect to the upper part Y of the chuck by means of wedge-shaped members 139 arranged at the ends of the chuck between the frame 129 and the adjacent side of the die, and spacer members 140 disposed at the sides of the upper part of the chuck between the frame 129 and the adjacent side portions of the die, all as shown in Figure 10.

The frame 129 at the ends of the upper part of the chuck is provided with a longitudinally extending recess 141 within which is disposed a locking lever 142. At one end, the locking lever is bent, as shown at 143, and provided with an inwardly extending lug 144. Each corner of the frame 129 is suitably recessed as at 145 to accommodate the bent end of the lever and the lug. At its opposite end, each lever is provided with an enlarged end 146 fitting in a recess 147, said recess having a reduced open end 148. Disposed between the reduced open end of the recess and the enlarged end 146 of the lever, is a spring 149 urging the lever and its enlarged end 146 outwardly of the upper part of the chuck. The lever 142 is confined in the recess 141, by reason of the engagement of its enlarged end in the recess 147 and at its opposite end is held by a bracket 150 secured to the frame 129 and through which the lever may freely slide. Pivotally mounted on one of the side frames of the upper part of the chuck, adjacent each end thereof, is a stop lever or sheet material guide indicated as a whole at 151. This lever has a reduced end 152 adjacent which is a recess 153 and at its opposite end is provided with an angular bend, indicated at 154. The pivot comprises a bolt 155, threaded into the side frame, carrying a hub 156 upon which the lever rocks. A coil torsion spring 157 is wound about the hub and has one straight end thereof 158 extended to engage the underside of the top plate 130 and another straight end thereof 159 connected to the lever by being hooked through an opening 160 in the angular portion thereof. As shown in Figure 10, two of these stop or guide levers are preferably employed. In the normal position of the levers 151, the spring projects the enlarged end thereof downwardly to engage the liner or plate 126. Thus, the guide levers substantially close one side of the chuck when the upper and lower parts thereof are projected apart by the springs 133. That is, the stop levers 151 will prevent sheet material from passing out of one of the substantially open sides of the lower part X of the chuck. Since the chucks are adapted to be positioned in an inclined plane, this is important in preventing the sheet material from dropping out of the chuck by gravity. In the normal position of the chuck, illustrated in Figure 14, the lug 144 is forced into contact with the reduced end 152 of the lever by reason of the spring 149. When, however, the upper part of the chuck is depressed, and the lever rocked on its pivot, the reduced end 152 of the lever will move to a position free of the lug 144 and the latter will then, by reason of the spring 149, move into the recess 153 in the lever and lock the same in upper position, as shown in Figure 8. In such position of this lever 151, the punched sheet material may be ejected from the chuck or dropped therefrom by gravity. In the simple form of chuck shown in Figure 13, when the lever is in its upper locked position, as in Figure 8, the enlarged end 146 of the lever 142 is projected outwardly of the chuck, by reason of the movement of the lever when the contact between the lug 144 and the reduced end of the stop 151 is relieved. The lower part of the chuck is provided with an enlarged opening 161 and the upper part of the chuck is also provided with an enlarged recess 162, as shown in Figure 13, whereby the locking lever may be unlocked by depressing the enlarged ends 146, whereupon the stop levers 151 will fall into the position shown in Figure 14 and the contact between the lug 144 and the reduced end of the guide levers 151 will be resumed. In this condition of the chuck, as illustrated in Figure 14, it is ready to receive a sheet of material to be punched.

Figure 11:
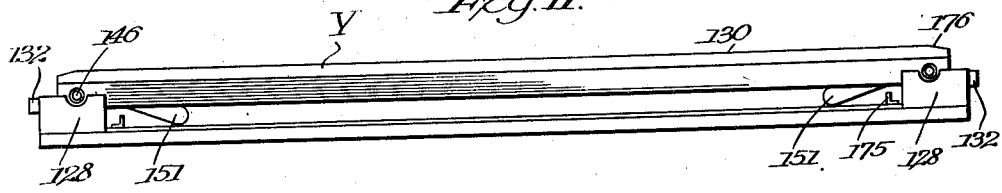
Figure 11 is a side elevation of the chuck of Figure 10.
Figure 12:
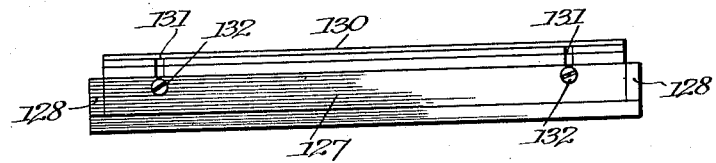
Figure 12 is an end elevation of the chuck of Figure 10.

Referring to Figures 11 and 15, a pair of spaced transversely extending angle irons 175 are connected to the supporting plate 126. These angle irons form transverse guides for the sheet material cooperating with the longitudinal stops 151.

The transverse side edges 176 of the top plate are beveled or inclined, as shown, so that the chuck is easily insertable between a pair of rollers, as in Figure 18, and in order, when the chuck is fixed, that the reciprocating roller will not abruptly strike the chuck and jar or detach it from the table.

The chuck so far described may be fixed to the inclined table 13 of Figure 1, or passed through the rollers 100 of Figure 18. When passed through the latter, the two parts of the chuck are each gradually compressed toward each other against the action of the springs 133. Where the chuck is fixed the movable upper part Y is gradually compressed by the rolling pressure within the bottom part X against the action of the springs.

In connection with the machine of Figure 1, I preferably associate with the chuck automatic means for releasing the stop or guide levers 151 by means of the roller 20.

Referring to Figures 6, 7, 8 and 9, the chuck is fixed to the table 13 by clamping bars 177 disposed parallel with the ends of the chuck and having flanges 178 engaging over the flanges 179 on the bottom or bed plate 125 adjacent the end walls 127 of the lower section of the chuck. The clamping bars are detachably held in position on the table 13 by a plurality of spaced bolts 180, the heads of which are fitted in recesses 181 in the table. The stems of the bolts extend through the bars and the bars are clamped to the table by nuts 182.

Supported at each end of the chuck is a lever 190 fixed to a shaft 191 rotatably mounted on the clamping bar 177, as shown in Figures 6 and 8. Normally, this lever 190 extends upwardly and has adjustably positioned thereon a projection 192 disposed in the path of movement of the reciprocating roller 20 after it leaves the chuck, as shown in Figure 7, and at the limit of movement of said roller in each direction.

The shaft 191, by means of the system of levers 193, 194, is connected to a slide mechanism disposed at one side of the chuck. The lever 194 is pivotally connected to a block 195, which, in turn, is connected to a pair of parallel spaced slidably mounted bars 196 at one side of the chuck.

Slidably connected to blocks 128 at each end of the chuck and slidable with the spaced bars 196 and disposed in the rear thereof, is a slotted plate 197 having a right angle slot 198. The slotted plate is connected to the spaced bars by suitable bolts or rivets at one end of the plate and at its opposite end is connected to the slotted bars and to the connecting block 195 by similar rivets, which serve to connect the bars, the plate and the block 195 together for simultaneous sliding movement of the bars and plate. As shown in Figure 9, the plate 197 is held to the block 128 at each end of the lower part of the chuck by a bolt 199, which engages a flanged member 200. The reduced portion 201 of the flanged member fits in the slot 198, so that the slotted plate may slide with respect thereto. The enlarged portion 202 of the flanged block engages over the adjacent edge portions of the slotted plate, whereby the plate is secured in position, and this enlarged portion 202 fits in the space defined by the bars, so that they may also slide freely and, like the plate, be guided by the flanged member. It will be understood, of course, that a similar construction is provided at the opposite end of the chuck, the two slide mechanisms and operating means being connected together by the spaced bars 196. It is to be observed that all of the slide mechanism, except the slotted plate is carried by the clamping bars 177 and that the slotted bar 197 to which the spaced bars are connected by block 195 for sliding movement, is supported on the end blocks 128 of the bottom part of the chuck. Connected to the block 195 at each end of the chuck is a suitable torsion spring 203, the springs exerting equal tension upon the respective blocks and serving to maintain the slide mechanism in the normal position, as shown in Figure 7.

The slide plate 197 is provided upon the opposite walls of the slot 198 with cam surfaces 204, as best shown in Figure 6. In this figure, the enlarged ends 146 of the locking lever 141 are shown as extending outwardly of the chuck and within the slot 198, the stops 151 being in locked position, as indicated in Figure 8 and the lug 144 therefore engaging in the recess 153 of the stop lever, and the spring 149 maintaining the locking lever 141 in its out-thrown position with the enlarged ends 146 exposed.

The normal position of the slotted plate is such that when the locking lever 141 is projected outwardly and the stops 151 are locked against the undersurface of the upper part of the chuck, the enlarged end 146 of the locking lever is projected into the slot 198 adjacent to the cam surfaces 204 on the walls of the slot and said enlarged end 146 is adapted to be engaged thereby and the lever 141 retracted to unlock the stop lever 151 when the slotted plate is moved.

The operation of this automatic mechanism for unlocking the stops 151 is best understood by reference to Figures 6 and 7. In Figure 7, the roll is shown as having left the chuck after completing the punching operation and has depressed the lug 192, whereupon, by reason of the lever system and slide mechanism, the slide plates 197 and spaced bars connected thereto, are moved to the right. Since the stop levers 151 are in locked position, as shown in Figure 8, and the enlarged heads 146 of the locking levers projected outwardly, into the slots 198, subsequent movement of the lever system and the slotted plate causes the cam surfaces 204 to engage the enlarged ends 146 of the locking levers and move the same inwardly to unlock the stop levers 151. Both of the stop levers 151 at each end of the chuck are simultaneously unlocked by the sliding movement of the slotted plates 197 and the stop levers drop to their normal position, as shown in Figure 14, to act as a guide and stop for sheet material inserted in the chuck. In this connection, the space defined by the bars 196 is such as to permit the ready insertion of sheet material therethrough into position to rest on the bed plate of the chuck. The springs 203, one of which is expanded and the other compressed, return the spaced bars, the slotted plates, the lever system and the lugs 192 to normal position, they being unrestricted in their return movement, since the enlarged ends 146 are now retracted out of the slots 198, to normal position with the guide levers 151 unlocked and extending downwardly as in Figure 14.

*Operation of the machine*

I will describe a typical operation of the invention, utilizing the chuck of the automatic type and the machine shown in Figure 1. The chuck is secured to the table or bed frame 13 of the base and fixed with its longitudinally extending open sides of the bottom part parallel to the bed frame, whereby sheets of material to be punched may be inserted in the chuck and eject or fall by gravity therefrom after the punching operation due to the inclination of the bed frame 13, as shown in Figure 3.

The chuck, of course, has the guide levers 151 thereof disposed in their downward position, as shown in Figure 14, acting as stops to prevent the sheet material from moving off the liner or plate 126 of the chuck. The operator having inserted a sheet of material to be punched, the hydraulic system is actuated and the roller carriage moves on the cross head 11 to engage the chuck. The initial rolling engagement causes the upper part of the chuck at the end thereof adjacent the roller to be depressed, whereby the cutting rules 135, at that end of the die, are gradually forced downwardly into the sheet. The provision of the flexible top plate 130 permits it to flex or give sufficiently to insure that the knives will go completely through the sheet material and form a clean shear and insures against any horizontal shifting of the dies such as would produce inaccuracies in a gasket. The flexible and resilient liner or plate 126 of relatively soft material as regards the knives, will readily absorb without distortion the very slight impact of the knives therewith. The top plate 130 will likewise return to normal when the rolling pressure is relieved. The upper part or die carrying member 130 of the chuck being depressed from its normal floating position by the rolling engagement against the action of springs 133 carries the dies into engagement with the work and simultaneously the stop levers 151 are rocked on their pivots, due to the downward movement of the upper part of the chuck, and move toward the undersurface of the top plate 130. The action of the rolling pressure is, therefore, a gradual shearing of the individual tangential portions of the sheet in a progressive manner and this rolling pressure, while of a degree to assure complete penetration of the knives into the sheet, is but a fraction of that required in a single acting press. As the roller moves over the top plate 130, producing concomitant shearing of consecutive individual portions of the sheet, due to the depression of the upper part of the chuck carrying the dies, the complete rocking of the lever 151 whereby its reduced portion 152 is disengaged from the lug 144, will permit the lug to slip into the recess 153 and lock the lever in its upward position, as in Figure 8. The lever at one end of the chuck will first be locked and then as the opposite end of the chuck is depressed, the other lever will be similarly locked. The locking of the levers throws the enlarged heads 146 of the levers 141 outwardly into the slots 198, as best shown in Figure 6.

The speed of movement of the cylinder 51 is, of course, controlled to regulate the speed of passage of the roller over the chuck and by means of the decelerating valves 84 and 85, the speed of travel of the carriage and roller is preferably slowed down after the roller leaves the chuck, so as to afford an elapsed time before the roller strikes the releasing lug 192 and releases the stops 151, sufficient for the sheets which have been punched, to be ejected or drop from the chuck by gravity it being understood that the die carrying member 130 returns to its normal floating position in spaced relation to the bed plate 125, after engagement with the roller 20. The sheets preferably drop by gravity and this is made possible by the inclination of the table 13 and the chuck, as well as by the automatic upward retraction of the stop levers 151 to locked position, shown in Figure 8.

The roller having left the chuck, and moving at reduced speed to allow time for the punched sheet to be removed from the chuck, at the end of its stroke engages the lug 192, depressing the same and releasing the guide levers 151, whereupon the operator inserts another blank sheet into the chuck. The hydraulic system reverses the roller and the speed of its reversal and return movement to engagement with the chuck can be controlled to insure that a sufficient time will elapse to permit the feeding of the new blank to the chuck. The rolling engagement of the roller and chuck again begins with the depression of the upper part of the chuck at that side adjacent the roller, whereby the die is caused to progressively and gradually act upon the sheet, forming another punched article. It will be noted that the only manual operation necessary is the insertion of the sheets in the chuck, since the punched sheets fall therefrom by gravity. If desired, I employ an automatic feeding means associated with the hydraulic mechanism or independent thereof and preferably timed to operate with the movement of the roller, as well as an ejecting means similarly actuated. This automatic feeding and ejecting means is particularly useful where the chuck is mounted in a horizontal plane.

By reason of the present method and machine, I am enabled, referring to Figure 10, to produce, at a single contact of the roller and chuck, a plurality of cylinder head gaskets 205, for example, which require fifty or more punching operations. The number of articles which may be punched is only limited by the size of the apparatus to accommodate the sheet material. In connection with Figure 10, I also employ the useful waste and punch it simultaneously with the cutting and forming of the gaskets 205 to produce smaller dimension gaskets indicated at 206.

The operation of cutting and forming is carried out with little or no vibration of the machine, due to the smooth operation of the hydraulic system and likewise because of the gradual application of the cutting dies to the sheet material, the impact of the dies upon the bed plate of the chuck is negligible. The absence, therefore, of any abrupt or sharp forces enables the machine to have a longer life and the dies are free from distortion or breakage from external causes. The stroke of the ram and hence the travel of the carriage is easily regulatable and it is to be noted in this connection that the lug 192, associated with the chuck for operating the slide mechanism, is likewise adjustable to vary the time limit within which a formed sheet may be ejected from the chuck before the stop levers 151 are unlocked and moved downwardly to engage the bed plate.

I find that the gradual application of a rolling pressure to move the dies into cutting relation progressively with consecutive portions of the sheet, enables delicate contours to be cut accurately and continuously since there is no horizontal shifting of the dies. The pressure employed at any one point is of a magnitude equal or greater than that applied at any point of a single acting press, but the total pressure, as well as the total power consumed, is materially less than in the case of a single acting press.

The liner or plate 126 will be formed of fibre, brass, or wooden blocks, or it may be of hardened spring steel. I prefer a plate made from steel, tempered to about the same hardness as that of the roller 20, although it may be substantially similar to the hardness of the cutting knives.

I have referred herein to automatic means for operating the lever 190 and lug 192. In lieu of utilizing the roller for accomplishing this automatic operation, I will attach a suitable hand-lever or treadle lever to the lever 190, for the purpose of actuating this lever and the slide mechanism of the chuck. While I prefer the automatic operating means, in some cases it may be desirable to render the machine manually operable. The treadle and hand-lever are of conventional design and are not shown.

What I claim is:

1. A punching machine of the class described comprising a base, a transversely inclined table on the base, a yielding member supported on the table and carrying a cutting instrumentality, said member adapted to support a sheet to be punched, a carriage on said base, said carriage carrying a roller having its periphery disposed in an inclined plane corresponding to the inclination of said table and said member disposed thereon, means for actuating said carriage and said roller to bring said roller in contact with said member and gradually and continuously depress the member to engage the cutting instrumentality with the sheet to be punched.

2. A punching machine of the class described comprising a base, a transversely inclined table on the base, a yielding member supported on the table and carrying a cutting instrumentality, said member adapted to support a sheet to be punched, a reciprocating carriage on said base, said carriage carrying a roller having its periphery disposed in an inclined plane corresponding to the inclination of said table and said member disposed thereon, means for actuating said carriage and said roller to bring said roller in contact with said member and gradually and continuously depress the member to engage the cutting instrumentality with the sheet to be punched.

3. A punching machine comprising a base, a table thereon, a chuck on said table having upper and lower members, one movable with respect to the other, said upper member carrying a cutting instrumentality, means on said chuck for holding a sheet of material in position, a reciprocating carriage carrying a roller adapted to depress the same and engage the chuck to depress the same and engage the cutting instrumentality with a sheet of material in both the to and from movements of the carriage, said sheet holding means being movable when said chuck is depressed to lock the same in a position allowing a punched sheet to eject from the chuck, and means carried by the chuck and operable by said roller for releasing said sheet holding means from locked position.

4. A chuck comprising upper and lower members, means for normally maintaining the members in spaced relation, a cutting instrumentality carried by one of said members, a bed plate on the other member adapted to receive the work disposed between said members, movable guide means normally engaging the bed plate, and maintaining the work in position, said upper member adapted to be depressed to engage the cutting instrumentality with the work, said guide means when said upper member is so depressed being locked thereto away from said bed plate, whereby the punched sheet may eject from the plate when the top and bottom members are in normal spaced relation, and means for unlocking said guide members.

5. A chuck comprising upper and lower members, means for normally maintaining the members in spaced relation, said upper member having a flexible and resilient top plate, a cutting instrumentality carried by said top plate and said lower member having a bed plate adapted to absorb impacts of said cutting instrumentality therewith.

6. A punching machine comprising a base, a cross head fixed to the base, a carriage slidably supported on the cross head, a roller on said carriage, said roller being freely rotatable on a shaft fixed to the carriage, and means for adjusting said shaft relative to the base.

7. A punching machine comprising a base, a carriage slidably supported on the base, a roller on said carriage, eccentric bushings on the carriage receiving the ends of a roller shaft, said roller being mounted for free rotation on the shaft, and means for moving said bushings to adjust the roller relative to the base.

8. A punching machine comprising a base, a cross head carried thereby, a carriage slidably mounted on said cross head, a roller on said carriage, means for moving said carriage mounted on said cross head, and means on said carriage cooperating with said last means for controlling the movement of the carriage.

9. A punching machine comprising a base, a cross head carried thereby, a flange on said cross head, a carriage slidably suspended from said cross head and below the same, a roller on said carriage, means for adjusting the roller relative to the base, and means for moving said carriage on the cross head.

10. A punching machine comprising a base, a table thereon, a carriage slidably mounted on said base, a roller on the carriage and supported in proximity to said table, hydraulic means for reciprocating said carriage and roller relative to said table, means connecting said hydraulic means with said carriage, and means for controlling said hydraulic means to vary the speed of travel of said carriage and roller as the latter approaches the limit of movement in one direction and begins its return movement in the opposite direction.

11. In a punching machine and in combination, means for applying a rolling pressure to a cutting instrumentality, a flexible resiliently supported member positioned to be acted upon by said rolling pressure and carrying the cutting instrumentality beneath the same, said member flexed by the rolling pressure and depressible thereby to engage the cutting instrumentality with a sheet supported below the same.

12. In a punching machine and in combination, means for applying a rolling pressure to a cutting instrumentality comprising a plurality of dies, a flexible resiliently supported member positioned to be acted upon by said rolling pressure and carrying said dies beneath the same, said member flexed by the rolling pressure and depressible thereby to engage the cutting instrumentality with a sheet supported below the same.

13. A punching machine comprising a base, a roller mounted for reciprocating movement on said base, a punching instrumentality, said punching instrumentality having means for supporting a sheet and having a plane surface adapted to be engaged by said roller and compressible thereby, means for retaining work to be punched in said cutting instrumentality, means operated by the movement of said roller over said punching instrumentality to lock said means in retracted position and permit the work to be removed, and means engagable by said roller to unlock said work retaining means.

14. A punching machine comprising means for supporting work, a resiliently mounted die supporting member normally urged away from the work, dies supported on said member facing the work, and means for applying pressure to said die supporting member to move the same toward said work support and bring the dies into engagement with work on said support.

15. A punching machine comprising means for supporting work, a resiliently mounted floating die supporting member, dies carried by said member facing the work, and means for applying a rolling pressure to said floating die supporting member to move the same toward said work support and bring the dies into engagement with work on said support, said floating member returning to normal position after application of the rolling pressure.

16. A punching machine comprising means for supporting work, a resiliently mounted die supporting member, dies supported on said member facing the work and normally being urged away from the work, means moving over said die supporting member to press the same toward said work support for bringing the dies into engagement with work on said support, and hydraulic means for moving said pressure applying means.

17. A punching machine comprising means for supporting work, a resiliently mounted floating die supporting member normally urged away from the work, dies carried by said member facing the work, means for applying a rolling pressure to said floating die supporting member to move the same toward said work support, to bring the dies into engagement with the work on said support, and reciprocating means actuating said pressure applying means.

18. A punching machine comprising means for supporting work, a floating resiliently supported die supporting member normally urged away from the work, dies carried by said member facing the work, and reciprocating pressure applying means moving across the die supporting member to progressively move successive transverse areas of said die supporting member toward said work support.

19. A punching machine comprising means for supporting work, a floating die supporting member, dies carried by said member facing the work, reciprocating pressure applying means moving across the die supporting member to move the same toward said work support, and means retarding movement of the pressure applying means when out of engagement with said floating member.

20. A punching machine comprising means for supporting work, a floating die supporting member, dies carried by said member facing the work, pressure applying means moving across the die supporting member to move the same toward said work support, and means for causing the pressure applying means to move at a reduced speed after engaging said floating member.

21. A punching machine comprising means for supporting work, a floating die supporting member, dies carried by said member facing the work, pressure applying means moving across the die supporting member to move the same toward said work support, and means for causing the pressure applying means to move at a reduced speed when the same is out of engagement with said floating member.

22. A punching machine comprising means for supporting work, a floating die supporting member, dies carried by said member facing the work, pressure applying means engaging the die supporting member to move the same toward the work, means for retaining the work in position, and means maintaining said retaining means in work releasing position after engagement of the pressure applying means with the die supporting member.

23. A punching machine comprising means for supporting work, a floating die supporting member, dies carried by said member facing the work, pressure applying means engaging the die supporting member to move the same toward the work, means for retaining the work in position, means maintaining said retaining means in work releasing position after engagement of the pressure applying means with the die supporting member, and means for returning said work retaining means to its work retaining position.

24. A punching machine comprising means for supporting work, a floating die supporting member, dies carried by said member facing the work, pressure applying means engaging the die supporting member to move the same toward the work, means for retaining the work in position, means maintaining said retaining means in work releasing position after engagement of the pressure applying means with the die supporting member, and means for automatically returning said work retaining means to its work retaining position.

25. In a punching machine, a pair of fixed rolls for applying a rolling pressure, a chuck having a bed plate and a resiliently mounted die carrying member, said die carrying member carrying dies facing the bed plate, said chuck being compressed by passage between said rolls to move the dies into engagement with work on said bed plate.

26. A means for punching work comprising a base, a floating member associated with the base and normally resiliently supported in spaced relation thereto, said floating member carrying cutting dies facing said base and being depressible to engage the cutting dies with work supported on said base.

27. A means for punching work comprising a base, a resilient floating member associated with the base and normally resiliently supported in spaced relation thereto, said floating member carrying cutting dies facing said base and being depressible to engage the cutting dies with work supported on said base, means normally retaining work in position on said base, said means being movable and being locked in a work releasing position upon depression of the die supporting member.

28. A means for punching work comprising a base, a floating member associated with the base and normally resiliently supported in spaced relation thereto, said floating member carrying cutting dies facing said base and being depressible to engage the cutting dies with work supported on said base, means normally retaining work in position on said base, said means being movable and being locked in a work releasing position upon depression of the die supporting member, and means for automatically unlocking the retaining means and returning the same to normal work retaining position.

29. A means for punching work comprising a base, a floating resilient and flexible member associated with the base and normally resiliently supported in spaced relation thereto, said floating member carrying cutting dies facing said base and being depressible to engage the cutting dies with work supported on said base.

30. A means for punching work comprising a base, a floating member associated with the base and normally resiliently supported in spaced relation thereto, said floating member carrying cutting dies facing said base and being depressible to engage the cutting dies with work supported on said base, a work retaining lever extending across the space between the die carrying member and base, said lever being pivotally mounted and movable to a locked position when the base and die carrying member are pressed together and adapted to remain in said locked position when said base and die carrying member resume their spaced relation so that the space between the same is free to permit removal of the work, and means for unlocking said lever returning it to normal work retaining position.

31. A punching machine comprising means for supporting work, a die carrying member resiliently supported in spaced relation to the work supporting means, dies supported on said member and facing the work, and means for compressing the work supporting means and said die carrying member together and bringing the dies into engagement with work on said support.

GEORGE T. BALFE.